(12) United States Patent
Pappas et al.

(10) Patent No.: US 11,015,354 B2
(45) Date of Patent: *May 25, 2021

(54) SYSTEM AND METHOD FOR INSTALLATION OF MOLDING

(71) Applicant: WELLINGTON INVESTMENT CORPORATION, Vancouver (CA)

(72) Inventors: Elias Pappas, Newcastle, WA (US); Ronald J. Johnson, Olympia, WA (US)

(73) Assignee: WELLINGTON INVESTMENT CORPORATION, Vancouver (CA)

( * ) Notice: Subject to any disclaimer, the term of this patent is extended or adjusted under 35 U.S.C. 154(b) by 51 days.

This patent is subject to a terminal disclaimer.

(21) Appl. No.: 15/599,380

(22) Filed: May 18, 2017

(65) Prior Publication Data

US 2017/0254098 A1 Sep. 7, 2017

Related U.S. Application Data

(63) Continuation of application No. 14/877,795, filed on Oct. 7, 2015, now Pat. No. 9,909,324, which is a
(Continued)

(51) Int. Cl.
*E04F 19/04* (2006.01)
*E04F 19/02* (2006.01)
(Continued)

(52) U.S. Cl.
CPC ............ *E04F 19/0459* (2013.01); *C09D 5/34* (2013.01); *E04F 13/02* (2013.01); *E04F 19/02* (2013.01);
(Continued)

(58) Field of Classification Search
CPC . E04F 21/00; E04F 19/02; E04F 19/04; E04F 19/0436; E04F 13/02; E04F 21/0084
See application file for complete search history.

(56) References Cited

U.S. PATENT DOCUMENTS 1,991,533 A 2/1935 Courtney et al.
1,998,692 A 4/1935 Van Rossem et al.
(Continued)

OTHER PUBLICATIONS

Angell, Larry, "Sweat Equity: Building a House at Half Cost" Angell Press Publishing: 2006. p. 233.
(Continued)

*Primary Examiner* — Brian D Mattei
*Assistant Examiner* — Charissa Ahmad
(74) *Attorney, Agent, or Firm* — Davis Wright Tremaine LLP; George C. Rondeau, Jr.; Heather M. Colburn

(57) ABSTRACT

A system for installing pre-painted moldings. The system includes pre-painted moldings each configured to be fastened to a wall by fasteners. The system also includes a caulk material, filler material, concealer material, and touchup paint each color matched to the paint color applied to the moldings. The caulk material is configured to fill a gap defined between each of the moldings and the wall to which the molding is fastened. The filler material is configured to fill a gap defined between any abutting portions of the moldings. The concealer material is configured to conceal any surface disturbances caused by the installation of the fasteners. The touchup paint is configured to adhere to the paint pre-painted on the moldings. The system may also include a marker configured to apply a coating color matched to the paint applied to the moldings, a scraping tool, and/or a buffing tool.

38 Claims, 4 Drawing Sheets

Related U.S. Application Data continuation of application No. 12/117,684, filed on May 8, 2008, now Pat. No. 9,181,718.

(51) Int. Cl.
*E04F 21/00* (2006.01)
*C09D 5/34* (2006.01)
*E04F 13/02* (2006.01)

(52) U.S. Cl.
CPC .......... *E04F 19/0436* (2013.01); *E04F 21/00* (2013.01); *E04F 21/0084* (2013.01); *E04F 2019/0454* (2013.01)

(56) References Cited

U.S. PATENT DOCUMENTS

| | | | |
|---|---|---|---|
| 2,044,572 | A | 6/1936 | Hollabaugh |
| 2,115,020 | A | 4/1938 | Hazen |
| 2,141,911 | A | 12/1938 | Hazen |
| 2,451,785 | A | 10/1948 | Thau |
| 3,335,765 | A | 8/1967 | Moonan |
| 3,589,586 | A | 6/1971 | Mazzer |
| 3,797,534 | A | 3/1974 | Skidmore |
| 3,813,985 | A | 6/1974 | Perkins |
| 4,159,352 | A | 6/1979 | Martin |
| 5,562,979 | A | 10/1996 | Easterlow et al. |
| 5,658,379 | A | 8/1997 | Battilana |
| 6,148,883 | A | 11/2000 | Wilson |
| 6,560,944 | B1 | 5/2003 | Wilson |
| 2004/0020048 | A1 | 2/2004 | Wildrick et al. |
| 2005/0044705 | A1 | 3/2005 | Wildrick et al. |
| 2005/0081356 | A1 | 4/2005 | Wildrick et al. |
| 2005/0131728 | A1 | 6/2005 | Tyreman |
| 2006/0151531 | A1 | 7/2006 | Tikusis |
| 2006/0251754 | A1 | 11/2006 | Herring |
| 2006/0257571 | A1 | 11/2006 | Tan |
| 2007/0088619 | A1 | 4/2007 | Kirwan et al. |
| 2007/0107342 | A1 | 5/2007 | Friedlich |
| 2007/0109910 | A1 | 5/2007 | Anderson et al. |

OTHER PUBLICATIONS

Baker, John, "Paint-Mixing Guide for Matching and Touch Up," Popular Mechanics Magazine: vol. 99, No. 3, Mar. 1953, p. 191.
Carter, Tim, "Matching Paint Colors Perfectly," Ask the Builder website (http://www.askthebuilder.com/matching-paintcolors-perfectly/, last accessed on Mar. 18, 2014) dated Feb. 1, 2001.
Carter, Tim, "Paint Colors—Mix to Match," Ask the Builder website (http://www.askthebuilder.com/paint-colors-mix-tomatch/, last accessed on Mar. 18, 2014) dated Nov. 7, 2005.
Crumpler, Paul, "The Basics of Spray Painting," North Carolina Department of Environment and Natural Resources, Division of Pollution Prevention and Environmental Assistance. (Dated back to at least Dec. 9, 2007 by Wayback Machine at http://web.archive.org/web/20071209214953/http://www.p2pays.org/ref/06/05671.htm; last accessed Feb. 11, 2011 ).
Department of the Interior, "The Preservation of Historic Architecture," Lyons Press, Guilford, CT; 2004. p. 470.
Dixon, Mark and Heidt, Bob, "House Painting Inside and Out," Taunton Press: Newtown, CT, 1997 (p. 7).
EHow Home and Garden, "How to Fill a Nail Hole" (http://www.ehow.com/how_2074199_fill-nail-hole.html, last accessed Oct. 21, 2010); verified by Wayback Machine back to at least Jan. 2008.
Hand, Jackson, "Now Everyone Can Use Lacquers," Popular Science Monthly; vol. 9, No. 3; Mar. 1967. pp. 151-153.
Henkenius, Merle, "Ozone-Friendly Paints," Popular Mechanics, vol. 169 (Aug. 1992), pp. 63 and 64.
Koleske, J.V., ed., "Painting and Coating Testing Manual," 14th ed., ASTM, Ann Arbor, MI; 1995. p. xiii.
Litchfield, Michael W., "Renovation," 3rd Edition, The Taunton Press: Newtown, CT, 2005.
LP Building Products, "Easy Installation for LP Prefinished Moulding" (http://www.lpcorp.com/prefinished_mouldings/, last accessed Oct. 21, 2010).
LP Building Products, "LP Moulding Product Guide" (dated by Wayback Machine to at least Nov. 2007: http://web.archive.org/web/2007111 0191746/www.lpcorp.com/Literature/LP Moulding_All_Products_Catalog.pdf, last accessed Oct. 22, 2010).
Mohawk Finishing Products Catalog for Colored Lacquer Enamel Aerosol from Nov. 18, 2006 (http://www.mohawk-finishing.com/catalog_browse.asp?ictnbr=460) (Date verified by Internet Archive Wayback Machine: https://web.archive.org/web/20061118234120/http://www.mohawk-finishing.com/catalog_browse.asp?ictNbr=460, last accessed on Mar. 18, 2014).
Noyes, Robert, "Pollution Prevention Technology Handbook," Noyes Publications, Park Ridge, NJ; 1993. p. 24.
Parks, Dennis W. and Jacobs, Jr., David H., "How to Paint Your Car," Motorbooks International, Hong Kong; 2003. p. 37.
Peters, Rick, "Home How to Handbook Trim," Sterling Publishing: New York, 2007.
Piper, James, "Evaluating Paint Quality," Facilitiesnet; Aug. 2006 (http://www.facilitiesnet.com/maintenanceoperations/article/Evaluating-Paint-Quality--4992; last accessed Feb. 12, 2011).
Spence, William P., "The Home Carpenter & Woodworker's Repair Manual," Sterling Publishing: 2006. China. p. 115.
Stoye, Dieter and Freitag, Werner, ed.s, "Paints, Coatings and Solvents," 2nd ed., Wiley-VCH; New York (1998), p. 268.
"52 Weekend Makeovers: Easy Projects to Transform your Home Inside and Out," The Taunton Press: 2007. Newtown, CT. pp. 28 and 29.
"Additives update: market remains attractive despite challenges," JCTCoatingsTech; Sep. 1, 2005 (http:1/goliath.ecnext.com/coms2/gi_0199-47888071Additives-update-market-remains-attractive.html; last accessed Feb. 12, 2011).
"Home Edition Plus: Installing Interior Door Trim" (http://www.homeadditionplus.com/finish-carpentry-info/Installing-Interior-Door-Trim.htm, last accessed Oct. 21, 2010); verified by Wayback Machine back to Mar. 20, 2007: http://web.archive.org/web/20070320230847/http://www.homeadditionplus.com/finish-carpentry-info/Installing-Interior-Door-Trim.htm.
"Types of Paints," Hy-Tech Thermal Solutions, Melbourne, FL (Dated back to at least Feb. 9, 2007 by Wayback Machine at http://web.archive.org/web/20070209233742/http://hytechsales.com/howtopaint!paint_types.html; last accessed Feb. 12, 2011).
Canadian Office Action issued in Canadian Patent Application No. 2,633,836, dated Aug. 14, 2013.
Information Disclosure Statement Transmittal filed herewith.

SYSTEM AND METHOD FOR INSTALLATION OF MOLDING

CROSS-REFERENCE TO RELATED APPLICATIONS

The present application is a continuation of U.S. application Ser. No. 14/877,795, filed on Oct. 7, 2015, which in turn is a continuation of U.S. application Ser. No. 12/117,684, filed on May 8, 2008.

BACKGROUND OF THE INVENTION

Field of the Invention

The present invention is directed generally to systems for installing and finishing decorative molding, and more particularly to systems for finishing pre-painted molding.

Description of the Related Art

In the construction trade, finish carpentry, which includes the installation of doors and decorative moldings, is both time consuming and costly. In residential construction, a house having a value of about $400,000 has a daily financing cost of about $75. Reducing the time required to install and paint the moldings would reduce the cost of building homes by reducing the financing and painting costs incurred by the builder. Therefore, a need exists for systems and methods that reduce the time required to install and finish decorative moldings. The present application provides these and other advantages as will be apparent from the following detailed description and accompanying figures.

BRIEF DESCRIPTION OF THE SEVERAL VIEWS OF THE DRAWING(S)

DETAILED DESCRIPTION OF THE INVENTION

Through investigation and research, the inventors determined that painting decorative moldings and doors at the jobsite consumes one of the largest portions of time (an average of about 6 to 10 days) in a residential construction project. During this time, none of the other construction trades (e.g., carpet layers, plumbers, tile installers, and the like) are allowed to enter the jobsite. Therefore, all aspects other than painting the moldings and doors of the construction project are interrupted.

While pre-painting moldings off-site and subsequently installing them on the jobsite may seem like a logical way to avoid this interruption, those in the construction arts have long believed that installing pre-painting moldings is infeasible because after installation, prior art pre-painted moldings do not have a satisfactory finished appearance. Specifically, portions of the pre-painted moldings damaged, cut, and otherwise disturbed by the installation process (e.g., mitered portions, portions with nail holes, and the like) could not be concealed or filled adequately. Therefore, to disguise these portions, the prior art pre-painted moldings required repainting thereby defeating the purpose of pre-painting them in the first place.

Figure 1:
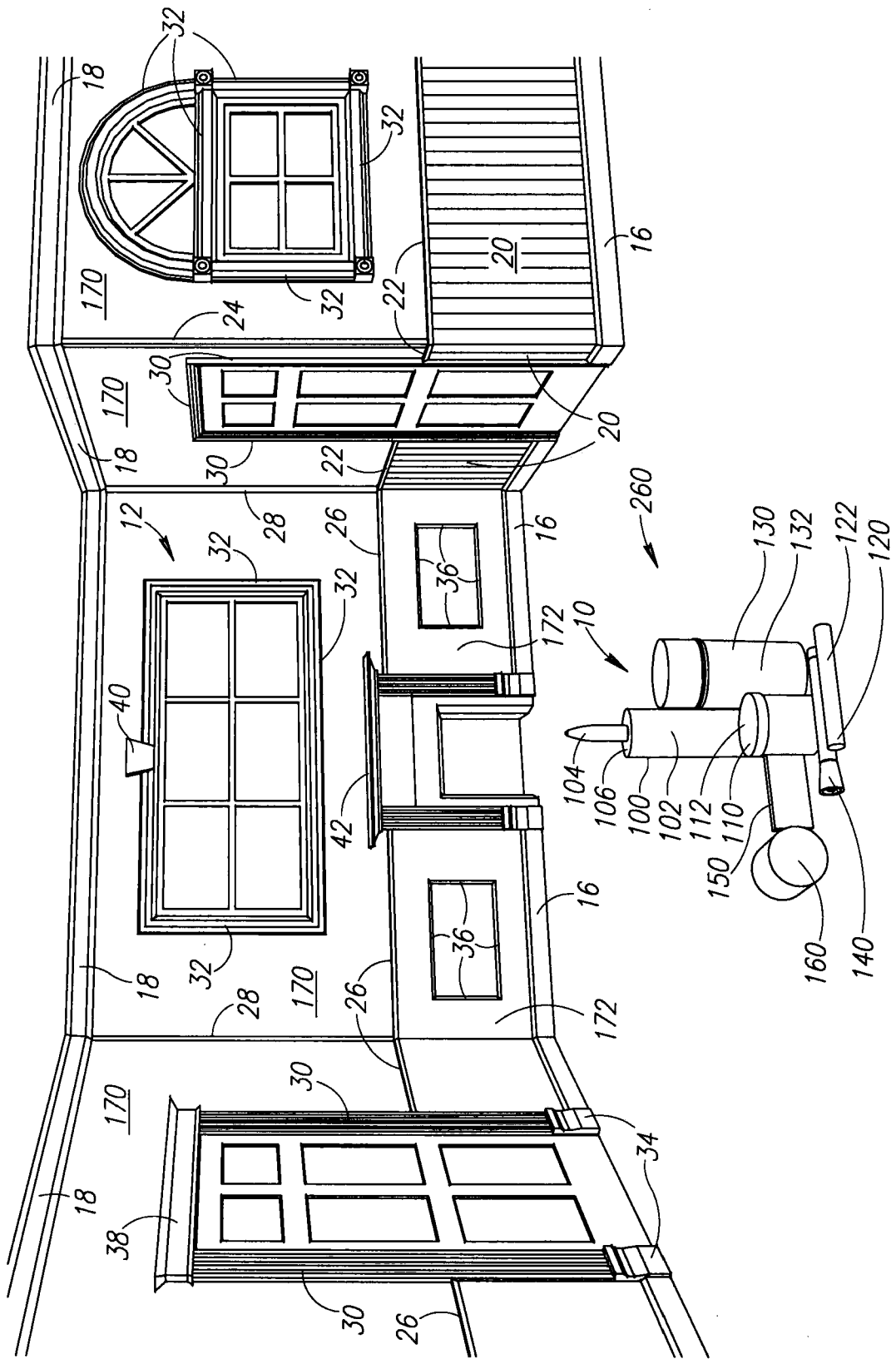
FIG. 1 is an illustration of a system for installing and finishing pre-painted molding.

Referring to FIG. 1, aspects of the present invention relate to a system 10 for installing a plurality of pre-painted decorative moldings 12 that provides a satisfactory finished appearance and does not require repainting beyond touching up selected portions. The moldings 12 may include any type of molding known in the art including baseboard molding 16, crown molding 18, wainscot paneling 20, wainscot cap 22, corner guard 24, chair rail 26, cove 28, door casing 30, window casing 32, plinth block 34, panel molding 36, architrave 38, keystone 40, base shoe (not shown), and the like. Built in shelves (not shown) and mantels 42 may also be considered decorative moldings.

The moldings 12 may be constructed using any paintable material known in the art, including solid wood, finger-jointed wood, paintable plastic, composite material, such as medium density fibreboard ("MDF"), Light and Ultralite density fibreboard (LDF), and the like. By way of a non-limiting example, suitable moldings may be constructed from Ultralite Supercoat MDF, and/or Platinum Prime MDF both manufactured by Moulding and Millwork, Inc., Manufacturing. Alternatively, the moldings 12 may be constructed from a plastic or similar material having a predetermined surface color that is functionally equivalent to an applied paint color of a pre-painted surface.

In the embodiment depicted in the drawings, the moldings 12 are pre-painted with a paint having a predetermined color. The paint applied to the pre-painted moldings 12 may include any suitable paint for use with moldings, such as an acrylic based paint. The paint may include additives configured to increase the flexibly of the paint thus helping to prevent the paint from cracking when the moldings 12 are flexed. The paint may be configured to provide a non-metal marking coating having desired quality and durability characteristics. Suitable paint for application to the moldings 12 includes Polar White, which may be obtained from Akzo Nobel Coatings Inc. of Louisville, Ky.

The paint may be applied using any suitable process known in the art. For example, the paint may be applied using a spray process, a flood coat process, a curtain coat process, and the like. By way of a non-limiting example, the paint may be applied by Sauder Prefinished Wood Products, of Surrey B.C. Canada, a division of Sauder Industries Inc.

After the paint is applied to the moldings 12, the dried or cured paint has an applied color. The system 10 includes finishing materials that are color matched to the applied color of the paint applied to the pre-painted moldings 12.

The color matched finishing materials of the system 10 include a container of caulk material 100. Caulk materials suitable for filling cracks, gaps, and the like are well known in the construction and woodworking arts and the invention is not limited to a particular type of caulk material. The container of caulk material 100 may include a standard caulk tube 102 filled with the caulk material 100, the tube 102 being configured to be loaded into a caulk gun (not shown). The caulk gun applies pressure to a first end portion (not shown) of the tube 102, which forces the caulk material 100 to exit the tube through an open ended tip 104 coupled to a second end portion 106 of the tube. The caulk material 100 may include any caulk material known in the art that may be color matched to the applied color of the paint applied to the pre-painted moldings 12. If the caulk material 100 has a first color before application and a second color after application (e.g., as the result of a curing process, a drying process, and the like), the second color of the caulk material 100 is color matched to the applied color of the paint applied to the pre-painted moldings 12. In some embodiments, the caulk material 100 may be paintable. By way of a non-limiting example, a suitable caulk material includes 7122 TT Glazing Compound, which may be purchased from A.B. Corliss Company, Inc.

The color matched finishing materials of the system 10 include a container of filler material 110. Filler materials suitable for filling surface defects, cracks, scratches, chips, gaps, nail holes, and the like are well known in the construction and woodworking arts and the invention is not limited to a particular type of filler material. The container of filler material 110 may include a jar 112 filled with any suitable filler material known in the art that may be color matched to the applied color of the paint applied to the pre-painted moldings 12. If the filler material 110 has a first color before application and a second color after application (e.g., as the result of a curing process, a drying process, and the like), the second color of the filler material 110 is color matched to the applied color of the paint applied to the pre-painted moldings 12. The filler material 110 may be configured to adhere to the paint applied to the pre-painted moldings 12. In some embodiments, the filler material 110 may be paintable. By way of a non-limiting example, a suitable filler material includes Patchal™ Putty manufactured by Mohawk Finishing Products of Hickory, N.C., which is a division of RPM Wood Finishes Group, Inc.

The color matched finishing materials of the system 10 include a concealer material 120. Concealer materials suitable for filling small surface defects, cracks, scratches, chips, gaps, nail holes, and the like are well known in the construction and woodworking arts and the invention is not limited to a particular type of concealer material. Any of the materials described above as suitable for use as the filler material 110 may also be used for the concealer material 120. The concealer material 120 may include a crayon 122 comprising any suitable filler material known in the art, such as putty, wax, a combination thereof, and the like, that may be color matched to the applied color of the paint applied to the pre-painted moldings 12. The crayon 122 may be formed using an extrusion process that improves bonding between the extruded concealer material and the paint. If the concealer material 120 has a first color before application and a second color after application (e.g., as the result of a curing process, a drying process, and the like), the second color of the concealer material 120 is color matched to the applied color of the paint applied to the pre-painted moldings 12. The concealer material 120 may be configured to adhere to the paint applied to the pre-painted moldings 12. In some embodiments, the concealer material 120 may be paintable. By way of a non-limiting example, a suitable concealer material includes Fil-Stik™ Putty Sticks manufactured by Mohawk Finishing Products of Hickory, N.C.

The color matched finishing materials of the system 10 include a container of touchup paint 130. Touchup paints suitable for coating small surface defects, cracks, scratches, chips, gaps, and the like are well known in the construction and woodworking arts and the invention is not limited to a particular type of touchup paint. The container of touchup paint 130 may include an aerosol can 132 filled with any suitable aerosolized touchup paint known in the art that may be color matched to the applied color of the paint applied to the pre-painted moldings 12. If the touchup paint 130 has a first color before application and a second color after being application (e.g., as the result of a curing process, a drying process, and the like), the second color of the touchup paint 130 is color matched to the applied color of the paint applied to the pre-painted moldings 12.

The touchup paint 130 may be configured to adhere to the paint applied to the pre-painted moldings 12. Further, the touchup paint 130 may be configured to adhere to the caulk material 100, the filler material 110, and/or the concealer material 120. The touchup paint 130 may be formulated to be halo resistant. For example, the chance of paint build on the moldings 12 that is easily visible on completion may be reduced by reducing the solid content of the touchup paint 130. Further, the touchup paint 130 may have a high solvent content (e.g., at least 80% solvent) allowing the touchup paint 130 to dry quickly. After the solvents dry (or flash off), the remaining solids may melt into or bond with the paint pre-painted on the moldings 12. By way of a non-limiting example, the touchup paint 130 may include a lacquer based enamel such as Satin Lacquer manufactured by Mohawk Finishing Products of Hickory, N.C.

The paint applied to the pre-painted moldings 12 has an applied sheen. The touchup paint 130 may be configured so that after it is applied to the moldings 12 and allowed to cure or dry, the touchup paint 130 has an applied sheen that is substantially similar to the applied sheen of the paint applied to the pre-painted moldings 12. In other words, the touchup paint 130 may be sheen matched to the applied sheen of the paint applied to the pre-painted moldings 12. The touchup paint 130 may include a paint color matched to applied color of the paint applied to the pre-painted moldings 12 and having a high solvent and low solid content configured to match the sheen level of the paint applied to the pre-painted moldings 12.

Optionally, the system 10 may include a marker 140 configured to apply a coating material (not shown) to the moldings 12. Markers suitable for applying a coating that is suitable for coating small surface defects, cracks, scratches, chips, gaps, and the like are well known in the construction and woodworking arts and the invention is not limited to a particular type of marker. The coating applied by the marker 140 is color matched to the applied color of the paint applied to the pre-painted moldings 12. If the coating has a first color before application and a second color after application (e.g., as the result of a curing process, a drying process, and the like), the second color of the coating of the marker 140 is color matched to the applied color of the paint applied to the pre-painted moldings 12. The coating applied by the marker 140 may be configured to adhere to the paint applied to the pre-painted moldings 12 and/or the touchup paint 130. By way of a non-limiting example, a suitable marker for use as the marker 140 includes an Ultra™ Mark Touchup Marker manufactured by Mohawk Finishing Products of Hickory, N.C.

Optionally, the system 10 may include a scraping tool 150. The scraping tool 150 may be used to scrape excess caulk material 100, excess filler material 110, and/or excess concealer material 120 from the moldings 12. The scraping tool 150 may include any suitable scraper known in the art. In FIG. 1, the scraping tool 150 is depicted as a card-type scraper.

Optionally, the system 10 may include a buffing tool 160. The buffing tool 160 may be used to buff any portions of the moldings 12 at which the scraping tool 150 was used to remove excess caulk material 100, excess filler material 110, and/or excess concealer material 120. The buffing tool 160 may also be used to buff any portions of the moldings 12 to improve the appearance of those portions. The buffing tool 160 may include any suitable buffer known in the art, including a nonabrasive woven nylon buffing pad provided by Mohawk Finishing Products of Hickory, N.C.

The moldings 12 may be considered part of system 10. Alternatively, the moldings 12 may be obtained separately and used with the other components of the system 10. Further, aspects of the system 10 are configured for use with previously installed moldings 12. Therefore, the system 10 may be used with moldings 12 that were obtained separately and installed previously.

Figure 2:
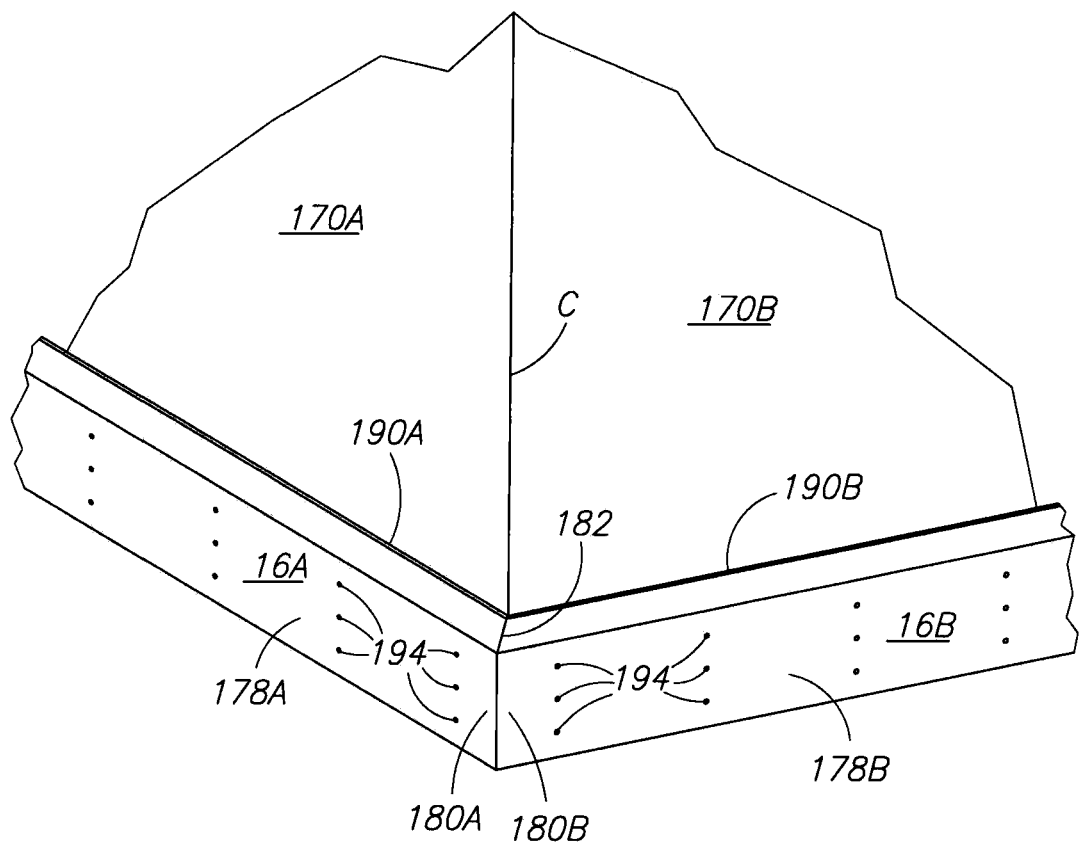
FIG. 2 is an illustration of abutting portions baseboard molding fastened to two adjoining walls intersecting at a corner.

Each of the moldings 12 is configured to be fastened to a wall 170 or other structure, such as a panel 172, another molding, and the like. Referring to FIG. 2, for illustrative purposes, the system 10 will be described with respect to a first pre-painted baseboard molding 16A and a second pre-painted baseboard molding 16B. The first baseboard molding 16A is cut to size (if necessary), mitered, and fastened to a first wall 170A. The second baseboard molding 16B is also cut to size (if necessary), mitered, and fastened to a second wall 170B. The walls 170A and 170B intersect to form a corner "C." Each of the first baseboard molding 16A and the second baseboard molding 16B has an outside surface 178A and 178B, respectively, that faces away from walls 170A and 170B, respectively.

At the corner "C," a portion 180A of the first baseboard molding 16A abuts a portion 180B of the second baseboard molding 16B. A gap 182 is defined between the abutting mitered end portion 180A of the first baseboard molding 16A and the abutting mitered end portion 180B of the second baseboard molding 16B. A gap 190A is defined between the first baseboard molding 16A and the wall 170A. A gap 190B is defined between the second baseboard molding 16B and the wall 170B. The first baseboard molding 16A is fastened to the wall 170A by a plurality of fasteners (not shown). A surface disturbance 194, such as a hole, is formed in the surfaces 178A and 178B of the first baseboard molding 16A and the second baseboard molding 16B, respectively, where each of the plurality of fasteners penetrates the one of the surface 178A of the first baseboard molding 16A and the surface 178B the second baseboard molding 16B.

The caulk material 100 is used to fill gaps defined between the moldings 12 and the walls or other structures to which the moldings are fastened. With reference to FIG. 2, the caulk material 100 may be used to fill the gap 190A defined between the first baseboard molding 16A and the wall 170A. The caulk material 100 may also be used to fill the gap 190B defined between the first baseboard molding 16B and the wall 170B. As mentioned above, the caulk material 100 is color matched to the applied color of the paint applied to the moldings 12. When the gaps 190A and 190B are filled with the caulk material 100, the filled gaps are substantially indistinguishable from the paint applied to the moldings 16A and 16B respectively. The caulk material 100 may be introduced into the gaps 190A and 190B using any method known in the art. Any portion of the caulk material protruding from the gaps 190A and 190B may be considered excess caulk material.

The filler material 110 is used to fill any gaps defined between abutting portions of the moldings 12. With reference to FIG. 2, the filler material 110 may be used to fill the gap 182 defined between the abutting portion 180A of the first baseboard molding 16A and the abutting portion 180B of the second baseboard molding 16B. The filler material 110 may also be used to fill the surface disturbances 194. As mentioned above, the filler material 110 is color matched to the applied color of the paint applied to the moldings 12. When the gap 182 is filled with the filler material 110, the filled gap is substantially indistinguishable from the paint applied to the moldings 16A and 16B. The filler material 110 may be introduced into the gap 182 using any method known in the art. Any portion of the filler material protruding from the gap 182 may be considered excess filler material.

The concealer material 120 may be used to fill any small surface disturbances in the moldings. For example, the concealer material 120 may be used to conceal or fill the surface disturbances 194 formed in the surfaces 178A and 178B of the first baseboard molding 16A and the second baseboard molding 16B, respectively. As mentioned above, the concealer material 120 is color matched to the applied color of the paint applied to the moldings 12. When the surface disturbances 194 are concealed or filled by the concealer material 120, the concealed surface disturbances are substantially indistinguishable from the paint applied to the moldings 16A and 16B. The concealer material 120 may be introduced into the surface disturbances 194 using any method known in the art. By way of a non-limiting example, the concealer material 120 may be applied by rubbing the crayon 122 (see FIG. 1) over the surface disturbances 194 formed in the surface 178A of the first baseboard molding 16A while pressing the crayon against the surface 178A. The concealer material 120 may be similarly rubbed into the surface disturbances 194 formed in the surface 178B of the second baseboard molding 16B. Any portion of the concealer material protruding from the surface disturbances 194 may be considered excess concealer material.

While each of the caulk material 100, the filler material 110, and the concealer material 120 have been described as being used to fill or conceal a particular gap or surface disturbance, those of ordinary skill in the art appreciate that the caulk material 100, the filler material 110, and the concealer material 120 may be used interchangeably to fill or conceal the gaps formed between abutting portions of the moldings 12, the gaps formed between the moldings and the walls or other structures to which the moldings are fastened, and/or the surface disturbances formed in the surfaces of the moldings.

The touchup paint 130 may be used to conceal any small surface disturbances or defects in the moldings 12. The touchup paint 130 may also be used to conceal any discolored areas, marks, inconsistencies in the paint, and the like that may render the moldings 12 visually unappealing. When applied to the moldings 12, the touchup paint 130 is substantially indistinguishable from the paint pre-painted on the moldings 16A and 16B. The touchup paint 130 may be used to coat the caulk material 100, the filler material 110, and/or the concealer material 120 to help make those materials substantially indistinguishable from the paint applied to the moldings 16A and 16B. Further, if the touchup paint 130 is sheen matched to the paint pre-painted on the moldings 12, the coating may give any filled or concealed areas a sheen that is substantially indistinguishable from the applied sheen of the paint applied to the moldings 16A and 16B.

If the abutting portions 180A and 180B of the moldings 16A and 16B do not fit together well, those portions may be sanded, primed, and painted with the touchup paint 130. By way of a non-limiting example, the abutting portion 180A and 180B may be sanded using an orbital sander, sanding block, vibrating sander, and the like.

The marker 140 may be used to apply a coating that coats, fills, or otherwise conceals small surface disturbances or defects in the moldings 12. The coating may also be used to conceal any discolored areas, marks, inconsistencies in the paint, and the like that may render the moldings 12 visually unappealing. The coating applied by the marker 140 to the moldings 12 is substantially indistinguishable from the paint applied to the moldings 16A and 16B. Thus, the coating applied by the marker 140 may at least partially conceal the surface disturbances or defects in the moldings 12. The marker 140 may be used to coat the caulk material 100, the filler material 110, and/or the concealer material 120 to help make those materials substantially indistinguishable from the paint applied to the moldings 16A and 16B.

Figure 3:
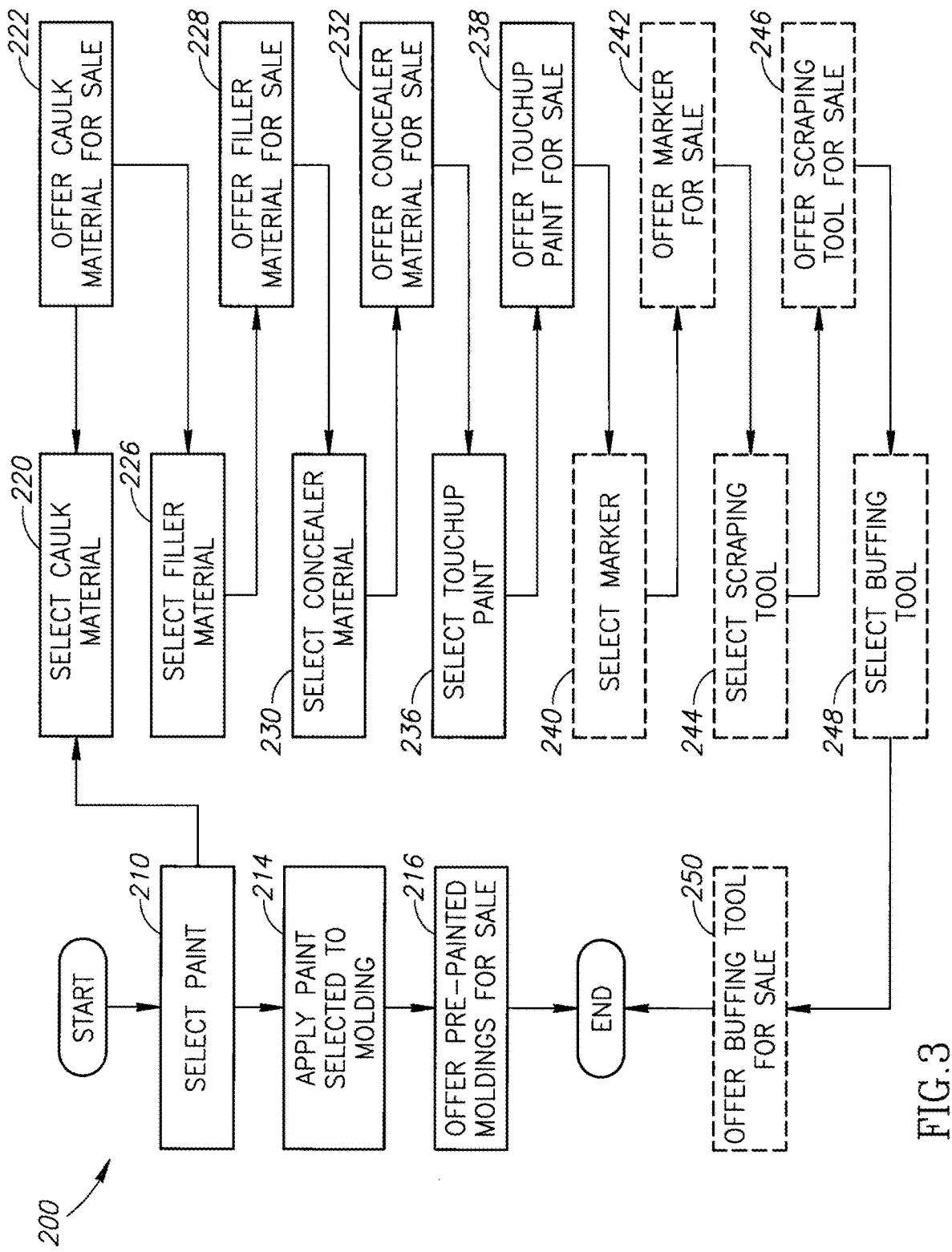
FIG. 3 is a flow diagram of a method of constructing the system of FIG. 1.

A method 200 for constructing the system 10 will now be described with reference to FIG. 3. The method 200 may be performed by a seller of the moldings 12 and the system 10. In first block 210, a paint is selected. The paint may be selected by selecting a paint to be applied to the moldings. By way of a non-limiting example, 367-W020-165 Acrybond Polar White base coat manufactured by Akzo Nobel Coatings Inc. of Louisville, Ky. may be selected. Alternatively, the paint may be selected by selecting a paint previously applied to commercially available pre-painted moldings. In such an embodiment, the seller may not sell the moldings 12.

In embodiments where the seller applies the paint to the moldings 12, in block 214, the first paint color is applied to the moldings 12. Then, the pre-painted moldings 12 are offered for sale in block 216. In embodiments where the seller does not apply the paint to the moldings 12, block 214 is omitted. Optionally, the seller may purchase a quantity of the pre-painted moldings and offer them for sale in block 216; however, this is not a requirement.

After the paint is selected, in block 220, the caulk material 100 is selected by the seller. The caulk material 100 selected for the system 10 in block 220 is color matched to the applied color of the paint selected in block 210. By way of a non-limiting example, 7122 TT Glazing Compound, which may be purchased from A.B. Corliss Company, Inc. may be selected in block 220. Then, the caulk material 100 is offered for sale in block 222.

In block 226, the filler material 110 is selected by the seller. The filler material 110 selected for the system 10 in block 226 is color matched to the applied color of the paint selected in block 210. By way of a non-limiting example, model number M735-1478PLMM (white) Patchal™ Putty manufactured by Mohawk Finishing Products of Hickory, N.C. may be selected in block 226. Then, the filler material 110 is offered for sale in block 228.

In block 230, the concealer material 120 is selected by the seller. The concealer material 120 selected for the system 10 in block 230 is color matched to the applied color of the paint selected in block 210. By way of a non-limiting example, model number M232-11066PLMM (white) Fil-Stik™ Putty Sticks manufactured by Mohawk Finishing Products of Hickory, N.C. may be selected in block 230. Then, the concealer material 120 is offered for sale in block 232.

In block 236, the touchup paint 130 is selected by the seller. The touchup paint 130 selected for the system 10 in block 236 is color matched to the applied color of the paint selected in block 210. The touchup paint 130 may also be sheen matched to the applied sheen of the paint selected in block 210. By way of a non-limiting example, model number M105-2803PLMM White Satin Lacquer manufactured by Mohawk Finishing Products of Hickory, N.C., may be selected in block 236. Then, the touchup paint 130 is offered for sale in block 238.

In block 240, the marker 140 is selected by the seller. The marker 140 selected for the system 10 in block 240 is color matched to the applied color of the paint selected in block 210. By way of a non-limiting example, model number M280-0202 Ultra™ Mark Touchup Markers manufactured by Mohawk Finishing Products of Hickory, N.C., may be selected in block 240. Then, the marker 140 is offered for sale in block 242.

In optional block 240, the scraping tool 150 is selected by the seller. The scraping tool 150 selected is configured to remove excess filler material from any gaps (e.g., the gap 182 illustrated in FIG. 2) defined between abutting moldings, excess caulk material from any gaps (e.g., the gaps 190A and 190B illustrated in FIG. 2) defined between the moldings 12 and the walls 170 (or other structures to which the moldings are fastened), and/or excess concealer material from any of the surface disturbances (e.g., the surface disturbances 194 illustrated in FIG. 2). Then, the scraping tool 150 is offered for sale in optional block 246.

In optional block 248, the buffing tool 160 is selected by the seller. The buffing tool 160 selected is configured to buff any portions of the moldings 12 at which the scraping tool 150 was used. The buffing tool 160 selected may also be configured to improve the appearance of the paint selected in block 210 by buffing small surface defects to blend them into the paint. Then, the buffing tool 160 is offered for sale in optional block 250.

Then, the method 200 terminates. The selection of the various components of the system 10 in blocks 220, 226, 230, 236, 240, 244, and 248 can be performed in any order and the method 200 is not limited to the order depicted in FIG. 3. Optionally, two or more of the caulk material, the filler material 110, the concealer material 120, and the touchup paint 130 may be offered for sale together as a kit 260 (see FIG. 1). The kit 260 may include the marker 140, the scraping tool 150, and/or the buffing tool 160.

Figure 4:
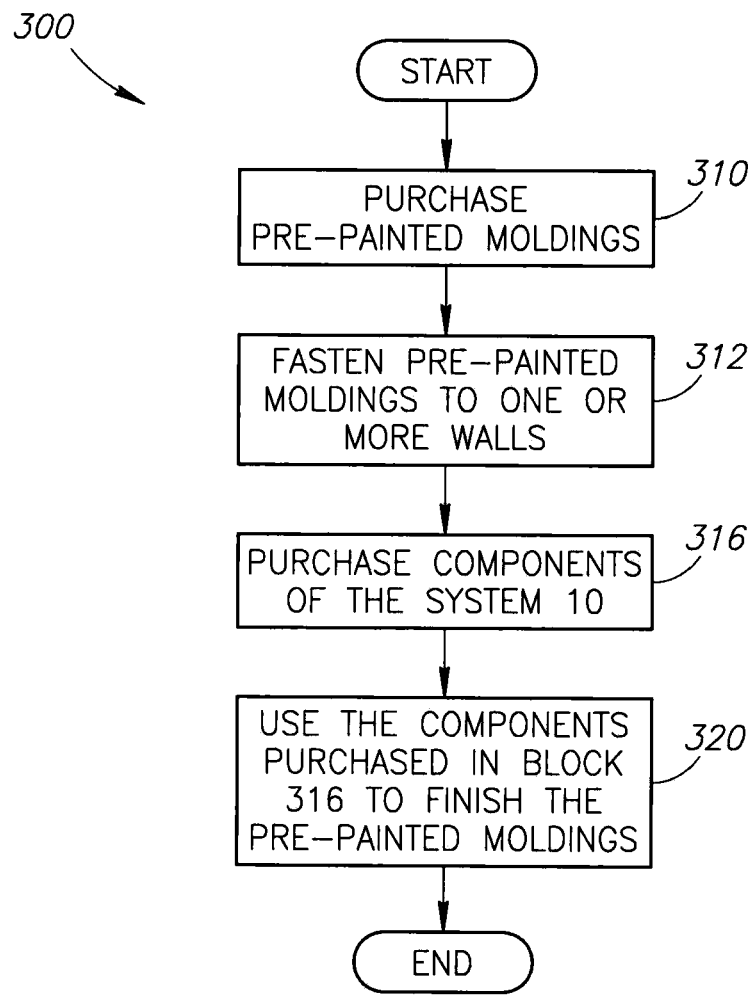
FIG. 4 is a flow diagram of a method of using the system of FIG. 1

A method 300 for using the system 10 will now be described with reference to FIG. 4. The method 300 may be performed by a purchaser of the moldings 12 and the system 10. In first block 310, the purchaser purchases a plurality of the pre-painted moldings 12.

In next block 312, the pre-painted moldings 12 are fastened to one or more walls. As mentioned above, a plurality of fasteners are used to fasten each of the plurality of moldings to a wall or other structure (such as another of the moldings). The selection of the plurality of fasteners may be based on the size of the surface disturbances (e.g., the surface disturbances 194 of FIG. 2). It may be desirable to select fasteners that created the smallest and/or least number of surface disturbances. For example, the plurality of fasteners may include small gauge headless nails each having a shaft coated with a heat-activated glue or adhesive. By way of a non-limiting example, the nails may be about 2 inches long and constructed from 23 gauge wire. An example of suitable nails includes item# P6/50-2.5 Grex 23 Gauge Headless Pins—2".

The nails may be configured to be loaded into a nail gun (not shown) and driven into the moldings 12 by the nail gun. The nail gun may heat the nails to activate any heat-activated adhesive coating their shafts. Alternatively, when a nail is driven into a molding by the nail gun, friction between the nail and the molding may create sufficient heat to activate the heat-activated adhesive coating on the shaft of the nail. It may be desirable to use a nail gun that causes the least amount of damage to the paint on the moldings 12, thus reducing the amount of touchup, concealing, and filling of surface disturbances. By way of a non-limiting example, the nail gun used may include a P650 23 Gauge 2" Headless Pinner manufactured by Grex, a Finish Pro 11 manufactured by Senco, and the like.

In block 316, one or more of the components of the system 10 are purchased. Specifically, in block 316, at least one of the caulk material 100, the filler material 110, the concealer material 120, and the touchup paint 130 is purchased. In some embodiments, the marker 140, the scraping tool 150, and/or the buffing tool 160 may also be purchased in block 316.

In block 320, the one or more of the components of the system 10 purchased in block 316 are used to finish the plurality of the pre-painted moldings 12 fastened to the one or more walls in block 312. For example, if the caulk material 100 was purchased, it may be installed in the gaps between the moldings purchased in block 310 and the one or more walls to which the moldings are fastened. If the filler material 110 was purchased, the filler material may be installed in gaps defined between abutting portions of the moldings purchased in block 310. If the concealer material 120 was purchased, the concealer material may be used to conceal the holes created by the fasteners used in block 312. If the scraping tool 150 was purchased, it may be used to remove any excess caulk material, filler material, and/or concealer material from the moldings. If the buffing tool 160 was purchased, it may be used to buff any areas of the moldings in which the scraping tool 150 was used. The buffing tool 160 may also be used to buff other areas of the moldings to improve their appearance. If the touchup paint 130 was purchased, it may be used to coat selected areas of the moldings to conceal surface defects, the filler material, the concealer material, the caulk material, surface disturbances, discolorations, marks, and the like. If the marker 140 was purchased, it may be used to apply a coating over surface defects, the filler material, the concealer material, the caulk material, surface disturbances, discolorations, marks, and the like.

While for illustrative purposes in block 316 selected ones of the components of the system 10 are purchased at the same time, those of ordinary skill in the art appreciate that one or more of the components of the system 10 may be purchased separately at another time and such embodiments are within the scope of the present teachings. Further, the components of the system 10 may have been purchased as the kit 260 depicted in FIG. 1.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A kit comprising:
pre-painted moldings each having been pre-painted with a first paint, the first paint having a predetermined color and having been both selected and applied to the pre-painted moldings before the pre-painted moldings were made available for purchase by a purchaser, the pre-painted moldings being configured to be fastened to one or more walls by a plurality of fasteners, installation of the plurality of fasteners in the pre-painted moldings causing a plurality of surface disturbances in the pre-painted moldings;
caulk material color matched to the predetermined color of the first paint pre-painted on the pre-painted moldings and configured to fill a gap defined between one or more of the pre-painted moldings and a wall of the one or more walls, the caulk filled gap being indistinguishable from the first paint pre-painted on the pre-painted moldings; and
concealer material color matched to the predetermined color of the first paint pre-painted on the pre-painted moldings and configured to be applied to the pre-painted moldings and, after being applied, to be indistinguishable from the first paint pre-painted on the pre-painted moldings, the concealer material comprising a crayon, the concealer material being configured to conceal the plurality of surface disturbances caused by the installation of the plurality of fasteners, each of the caulk material and the concealer material having been preselected for use with the pre-painted moldings before the kit is made available for purchase by the purchaser.

2. The kit of claim 1, wherein the crayon is a wax crayon formed by extrusion.

3. The kit of claim 1, further comprising:
a scraping tool configured to remove excess concealer material from the pre-painted moldings.

4. The kit of claim 3, further comprising:
a buffing tool configured to buff any portions of the pre-painted moldings from which the excess concealer material was removed by the scraping tool.

5. The kit of claim 1, wherein the pre-painted moldings comprise one or more surface defects, and the kit further comprises:
a marker configured to apply a coating to the one or more surface defects of the pre-painted moldings, the coating being color matched to the predetermined color of the first paint pre-painted on the pre-painted moldings and configured to at least partially conceal the one or more surface defects.

6. The kit of claim 1, further comprising:
touchup paint color matched to the predetermined color of the first paint pre-painted on the pre-painted moldings and configured to adhere to the first paint pre-painted on the pre-painted moldings and once adhered to be indistinguishable from the first paint pre-painted on the pre-painted moldings.

7. The kit of claim 1, further comprising:
filler material color matched to the predetermined color of the first paint pre-painted on the pre-painted moldings and configured to fill a gap defined between any portions of the pre-painted moldings that abut one another, the gap filled with the filler material being indistinguishable from the first paint pre-painted on the abutting portions of the pre-painted moldings.

8. The kit of claim 7, further comprising:
a scraping tool configured to remove excess filler material from the pre-painted moldings.

9. The kit of claim 8, further comprising:
a buffing tool configured to buff any portions of the pre-painted moldings from which the excess filler material was removed by the scraping tool.

10. A method comprising:
pre-painting moldings with a first paint having a predetermined color, the first paint having been both selected and applied to the pre-painted moldings before the pre-painted moldings are made available for purchase by a purchaser, the pre-painted moldings being configured to be fastened to one or more walls by a plurality of fasteners, installation of the plurality of fasteners in the pre-painted moldings causing a plurality of surface disturbances in the pre-painted moldings;
preselecting caulk material for use with the pre-painted moldings before the pre-painted moldings are made available for purchase by the purchaser, the caulk material being color matched to the predetermined color of the first paint pre-painted on the pre-painted moldings, the caulk material being configured to fill a gap defined between one or more of the pre-painted moldings and a wall of the one or more walls, the caulk filled gap being indistinguishable from the first paint pre-painted on the pre-painted moldings; and
preselecting concealer material for use with the pre-painted moldings before the pre-painted moldings are made available for purchase by the purchaser, the concealer material being color matched to the predetermined color of the first paint pre-painted on the pre-painted moldings, the concealer material comprising a crayon, the concealer material being configured to be applied to the pre-painted moldings and, after being applied, to be indistinguishable from the first paint pre-painted on the pre-painted moldings, the concealer material being configured to conceal the plurality of surface disturbances caused by the installation of the plurality of fasteners.

11. The method of claim 10, wherein the crayon is a wax crayon formed by extrusion.

12. The method of claim 10, further comprising:
preselecting a marker for use with the pre-painted moldings before the pre-painted moldings are made available for purchase by the purchaser, the pre-painted moldings comprising one or more surface defects, the marker being configured to apply a coating to the one or more surface defects of the pre-painted moldings, the coating being color matched to the predetermined color of the first paint pre-painted on the pre-painted moldings and configured to at least partially conceal the one or more surface defects.

13. The method of claim 10, further comprising:
preselecting touchup paint for use with the pre-painted moldings before the pre-painted moldings are made available for purchase by the purchaser, the touchup paint being color matched to the predetermined color of the first paint pre-painted on the pre-painted moldings and configured to adhere to the first paint pre-painted on the pre-painted moldings and once adhered to be indistinguishable from the first paint pre-painted on the pre-painted moldings.

14. The method of claim 10, further comprising:
preselecting filler material for use with the pre-painted moldings before the pre-painted moldings are made available for purchase by the purchaser, the filler material being color matched to the predetermined color of the first paint pre-painted on the pre-painted moldings and configured to fill a gap defined between any portions of the pre-painted moldings that abut one another, the gap filled with the filler material being indistinguishable from the first paint pre-painted on the abutting portions of the pre-painted moldings.

15. The method of claim 10, further comprising:
offering the pre-painting moldings, the caulk material, and the concealer material for sale together as a kit.

16. The method of claim 15, wherein the kit further comprises:
a scraping tool configured to remove excess concealer material from the pre-painted moldings.

17. The method of claim 16, wherein the kit further comprises:
a buffing tool configured to buff any portions of the pre-painted moldings from which the excess concealer material was removed by the scraping tool.

18. A kit comprising:
pre-painted moldings each having been pre-painted with a first paint, the first paint having a predetermined color and having been both selected and applied to the pre-painted moldings before the pre-painted moldings were made available for purchase by a purchaser, the pre-painted moldings being configured to be fastened to one or more walls by a plurality of fasteners, installation of the plurality of fasteners in the pre-painted moldings causing a plurality of surface disturbances in the pre-painted moldings, the pre-painted moldings comprising one or more surface defects;
caulk material color matched to the predetermined color of the first paint pre-painted on the pre-painted moldings and configured to fill a gap defined between one or more of the pre-painted moldings and a wall of the one or more walls, the caulk filled gap being indistinguishable from the first paint pre-painted on the pre-painted moldings;

concealer material color matched to the predetermined color of the first paint pre-painted on the pre-painted moldings and configured to be applied to the pre-painted moldings and, after being applied, to be indistinguishable from the first paint pre-painted on the pre-painted moldings, the concealer material being configured to conceal the plurality of surface disturbances caused by the installation of the plurality of fasteners, each of the caulk material and the concealer material having been preselected for use with the pre-painted moldings before the kit is made available for purchase by the purchaser;

a marker configured to apply a coating to the one or more surface defects of the pre-painted moldings, the coating being color matched to the predetermined color of the first paint pre-painted on the pre-painted moldings and configured to at least partially conceal the one or more surface defects; and a scraping tool configured to remove excess concealer material from the pre-painted moldings.

19. The kit of claim 18, wherein the concealer material comprises a wax crayon formed by extrusion.

20. The kit of claim 18, further comprising:
touchup paint color matched to the predetermined color of the first paint pre-painted on the pre-painted moldings and configured to adhere to the first paint pre-painted on the pre-painted moldings and once adhered to be indistinguishable from the first paint pre-painted on the pre-painted moldings.

21. The kit of claim 18, further comprising:
filler material color matched to the predetermined color of the first paint pre-painted on the pre-painted moldings and configured to fill a gap defined between any portions of the pre-painted moldings that abut one another, the gap filled with the filler material being indistinguishable from the first paint pre-painted on the abutting portions of the pre-painted moldings.

22. The kit of claim 21, wherein the scraping tool is configured to remove excess filler material from the pre-painted moldings, and
the kit further comprises a buffing tool configured to buff any portions of the pre-painted moldings from which the excess filler material was removed by the scraping tool.

23. A kit comprising:
pre-painted moldings each having been pre-painted with a first paint, the first paint having a predetermined color and having been both selected and applied to the pre-painted moldings before the pre-painted moldings were made available for purchase by a purchaser, the pre-painted moldings being configured to be fastened to one or more walls by a plurality of fasteners, installation of the plurality of fasteners in the pre-painted moldings causing a plurality of surface disturbances in the pre-painted moldings, the pre-painted moldings comprising one or more surface defects;

caulk material color matched to the predetermined color of the first paint pre-painted on the pre-painted moldings and configured to fill a gap defined between one or more of the pre-painted moldings and a wall of the one or more walls, the caulk filled gap being indistinguishable from the first paint pre-painted on the pre-painted moldings;

concealer material color matched to the predetermined color of the first paint pre-painted on the pre-painted moldings and configured to be applied to the pre-painted moldings and, after being applied, to be indistinguishable from the first paint pre-painted on the pre-painted moldings, the concealer material being configured to conceal the plurality of surface disturbances caused by the installation of the plurality of fasteners, each of the caulk material and the concealer material having been preselected for use with the pre-painted moldings before the kit is made available for purchase by the purchaser; and a marker configured to apply a coating to the one or more surface defects of the pre-painted moldings, the coating being color matched to the predetermined color of the first paint pre-painted on the pre-painted moldings and configured to at least partially conceal the one or more surface defects.

24. The kit of claim 23, wherein the concealer material comprises a wax crayon formed by extrusion.

25. The kit of claim 24, further comprising:
a scraping tool configured to remove excess concealer material from the pre-painted moldings; and
a buffing tool configured to buff any portions of the pre-painted moldings from which the excess concealer material was removed by the scraping tool.

26. The kit of claim 23, further comprising:
touchup paint color matched to the predetermined color of the first paint pre-painted on the pre-painted moldings and configured to adhere to the first paint pre-painted on the pre-painted moldings and once adhered to be indistinguishable from the first paint pre-painted on the pre-painted moldings.

27. The kit of claim 23, further comprising:
filler material color matched to the predetermined color of the first paint pre-painted on the pre-painted moldings and configured to fill a gap defined between any portions of the pre-painted moldings that abut one another, the gap filled with the filler material being indistinguishable from the first paint pre-painted on the abutting portions of the pre-painted moldings.

28. The kit of claim 27, further comprising:
a scraping tool configured to remove excess filler material from the pre-painted moldings.

29. The kit of claim 28, further comprising:
a buffing tool configured to buff any portions of the pre-painted moldings from which the excess filler material was removed by the scraping tool.

30. A kit comprising:
pre-painted moldings each having been pre-painted with a first paint, the first paint having a predetermined color and having been both selected and applied to the pre-painted moldings before the pre-painted moldings were made available for purchase by a purchaser, the pre-painted moldings being configured to be fastened to one or more walls by a plurality of fasteners, installation of the plurality of fasteners in the pre-painted moldings causing a plurality of surface disturbances in the pre-painted moldings;

caulk material color matched to the predetermined color of the first paint pre-painted on the pre-painted moldings and configured to fill a gap defined between one or more of the pre-painted moldings and a wall of the one or more walls, the caulk filled gap being indistinguishable from the first paint pre-painted on the pre-painted moldings;

concealer material color matched to the predetermined color of the first paint pre-painted on the pre-painted moldings and configured to be applied to the pre-painted moldings and, after being applied, to be indistinguishable from the first paint pre-painted on the pre-painted moldings, the concealer material being configured to conceal the plurality of surface disturbances caused by the installation of the plurality of fasteners, each of the caulk material and the concealer material having been preselected for use with the pre-painted moldings before the kit is made available for purchase by the purchaser, the concealer material comprising a wax crayon formed by extrusion;

a scraping tool configured to remove excess concealer material from the pre-painted moldings; and a buffing tool configured to buff any portions of the pre-painted moldings from which the excess concealer material was removed by the scraping tool.

31. The kit of claim 30, further comprising:

touchup paint color matched to the predetermined color of the first paint pre-painted on the pre-painted moldings and configured to adhere to the first paint pre-painted on the pre-painted moldings and once adhered to be indistinguishable from the first paint pre-painted on the pre-painted moldings.

32. A method comprising:

pre-painting moldings with a first paint having a predetermined color, the first paint having been both selected and applied to the pre-painted moldings before the pre-painted moldings are made available for purchase by a purchaser, the pre-painted moldings being configured to be fastened to one or more walls by a plurality of fasteners, installation of the plurality of fasteners in the pre-painted moldings causing a plurality of surface disturbances in the pre-painted moldings;

preselecting caulk material for use with the pre-painted moldings before the pre-painted moldings are made available for purchase by the purchaser, the caulk material being color matched to the predetermined color of the first paint pre-painted on the pre-painted moldings, the caulk material being configured to fill a gap defined between one or more of the pre-painted moldings and a wall of the one or more walls, the caulk filled gap being indistinguishable from the first paint pre-painted on the pre-painted moldings;

preselecting concealer material for use with the pre-painted moldings before the pre-painted moldings are made available for purchase by the purchaser, the concealer material being color matched to the predetermined color of the first paint pre-painted on the pre-painted moldings, the concealer material being configured to be applied to the pre-painted moldings and, after being applied, to be indistinguishable from the first paint pre-painted on the pre-painted moldings, the concealer material being configured to conceal the plurality of surface disturbances caused by the installation of the plurality of fasteners; and preselecting a marker for use with the pre-painted moldings before the pre-painted moldings are made available for purchase by the purchaser, the pre-painted moldings comprising one or more surface defects, the marker being configured to apply a coating to the one or more surface defects of the pre-painted moldings, the coating being color matched to the predetermined color of the first paint pre-painted on the pre-painted moldings and configured to at least partially conceal the one or more surface defects.

33. The method of claim 32, wherein the concealer material comprises a wax crayon formed by extrusion.

34. The method of claim 32, further comprising:

preselecting touchup paint for use with the pre-painted moldings before the pre-painted moldings are made available for purchase by the purchaser, the touchup paint being color matched to the predetermined color of the first paint pre-painted on the pre-painted moldings and configured to adhere to the first paint pre-painted on the pre-painted moldings and once adhered to be indistinguishable from the first paint pre-painted on the pre-painted moldings.

35. The method of claim 32, further comprising:

preselecting filler material for use with the pre-painted moldings before the pre-painted moldings are made available for purchase by the purchaser, the filler material being color matched to the predetermined color of the first paint pre-painted on the pre-painted moldings and configured to fill a gap defined between any portions of the pre-painted moldings that abut one another, the gap filled with the filler material being indistinguishable from the first paint pre-painted on the abutting portions of the pre-painted moldings.

36. The method of claim 32, further comprising:

offering the pre-painting moldings, the caulk material, the concealer material, and the marker for sale together as a kit.

37. The method of claim 36, wherein the kit further comprises:

a scraping tool configured to remove excess concealer material from the pre-painted moldings.

38. The method of claim 37, wherein the kit further comprises:

a buffing tool configured to buff any portions of the pre-painted moldings from which the excess concealer material was removed by the scraping tool.

* * * * *